July 30, 1963  N. J. IMPERIAL ETAL  3,099,162

PORTABLE TEMPERATURE MEASURING DEVICE

Filed April 27, 1959

INVENTORS
N. J. IMPERIAL
P. J. McGANNON
BY
ATTORNEY 3,099,162
PORTABLE TEMPERATURE MEASURING DEVICE
Nicholas J. Imperial, New York, N.Y. (28 Price Drive,
Edison, N.J.), and Patrick J. McGannon, 78 Stevens
St., Oceanside, N.Y.
Filed Apr. 27, 1959, Ser. No. 809,091
5 Claims. (Cl. 73—376)

The present invention relates generally to devices for measuring temperature and particularly to such devices of a portable nature for attachment to bodies whereby temperatures thereof may be measured.

While the invention may find utility in others fields, as will be apparent to those skilled in the art, it is particularly useful in measuring temperatures of persons without the usual inconvenience of oral or rectal methods and without the normal requirement of some cooperation on the part of the patient or other person whose temperature is to be measured.

While the usual oral or rectal method of taking temperature has the advantage of most intimacy with internal body temperature, such methods generally require cooperation on the part of the patient, most frequently need to be supervised, and invariably demand a certain amount of immobilization on the part of the patient.

It is the general object of the present invention to minimize or completely eliminate the necessity of cooperation by, immobilization of, and supervision over a patient while measuring temperatures.

A feature of the invention whereby the above general object is attained is the provision of a portable temperature measuring device comprising a shell enclosing a temperature responsive element where part of the shell comprises a material of high thermal conductivity, to the inner surface of which the said element is secured in intimate thermal contact, where means is provided to attach the device to a person's body, such as under the armpit or next to some other suitable skin area, so that the said part of the shell assumes and transmits to the element the temperature of the pertinent body area, and where means is provided for translating responses of said element into indications of temperature.

By means of one feature of the invention a thermometer of the conventional type, such as clinical or laboratory, may be completely housed in a light portable container of such size as can conveniently be attached to a body area for recording or measuring body temperature.

Another feature of the invention provides for such a container having one portion of high thermal conductivity material, such as aluminum, and other portion of transparent material, such as plastic, and means for bonding the bulb or reservoir of said thermometer to the inner surface of said one container portion and in high thermal conductivity relation thereto, whereby the thermometer will visually indicate body temperatures while being completely protected from external harm.

A further feature of the invention resides in the use of a metal plate-plastic cover combination comprising the container, where the plate-cover assembly is sealed to form a hollow container within which a clinical or laboratory type thermometer is mounted for visual reading through the cover, and means, such as a strap or band, attached to the container, preferably as part of the cover, for securing the container to a body around some extremity such as an arm or leg or neck, etc.

By virtue of the foregoing features, and others which will be apparent from description of exemplary embodiments of the invention, one could measure temperatures of persons while they are fairly active, as in normal daily activity, or while asleep, etc. A clinical thermometer could be used to record the maximum reading over a period of time, such as a night's sleep; whereas, a laboratory type thermometer could be used for periodic current readings. By assembling one of each type of thermometer in the same container both types of readings could be obtained. Other ramifications and variations will be suggested to those skilled in the art by virtue of subsequent description.

These and other features of the invention will be readily understood from the description to follow of exemplary embodiments shown in the drawing wherein the separate figures may be briefly described as follows.

Throughout the following description of the structural details of embodiments shown in the drawings, corresponding parts of the various figures will, insofar as possible, be given the same reference numerals.

Figure 1:
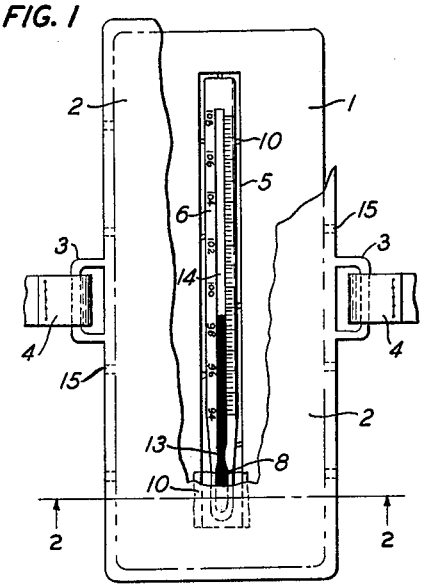
FIG. 1 shows one embodiment of the invention illustrating the use of a clinical type thermometer mounted in a case or container of modernistic contour design.

A metal plate 1 and a plastic cover 2 comprise a shell or case or container provided with strap loops 3 whereby a strap or straps 4, or other suitable fastening means, can be secured in order to attach the case to a body area. Plate 1 can be of any material having a high thermal conductivity. Aluminum is preferable due to its light weight, but it will be apparent that other suitable materials are known to the art. In the embodiments shown, the cover 1 is preferably of transparent plastic; however, those skilled in the art will know of many other suitable materials and it is apparent that the cover 1 may involve magnifying properties or not depending upon particular applications.

Figure 2:
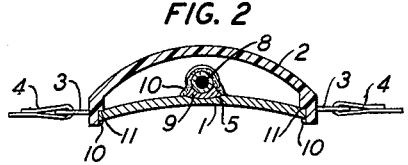
FIG. 2 is a section taken in the direction of line 2—2 of FIG. 1.
Figure 2A:
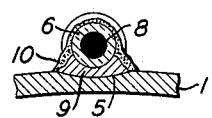
FIG. 2A is a partial enlargement of FIG. 2 useful in understanding details of the suggested mounting or securing means for the thermometer.
Figure 4:
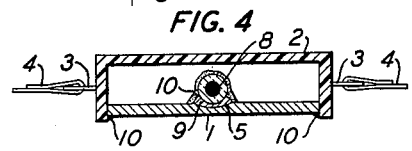
FIG. 4 is a section taken in the direction of line 4—4 of FIG. 3.
Figure 4A:
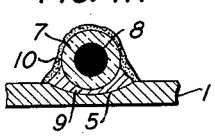
FIG. 4A is a partial enlargement of FIG. 4 illustrating detail regarding suggested bonding or securing means for the thermometer.

In FIG. 2 the plate 1 and cover 2 are shown having a modernistic contour; whereas, in FIG. 4 the assembly involves straight-line design. It is expected that a particular field of use for the present invention is in the area of measuring temperatures of persons by attaching the assembly, by means of strap 4 for example, to an extremity of the body, such as an arm, leg, neck, etc. In any case the assembly should be attached so that the plate 1 is in close contact with a fairly large skin area in order to assume the temperature thereof. In some cases a slight contour (see FIG. 2) may be preferable; whereas, a substantially flat plate (see FIG. 4) may be desirable in other instances.

Figure 7:
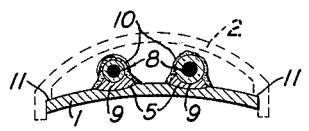

Along the central inner length of plate 1 is provided a groove or depression 5 wherein a clinical thermometer 6 (FIG. 1) or a laboratory thermometer 7 (FIG. 2) may be secured such that (see FIGS. 2, 2A, 4, 4A and 7) at least the reservoir 8 will be in intimate and high thermal conductivity with plate 1. This requirement, as will be apparent, is to permit the reservoir 8 to assume, as closely as possible, the temperature of plate 1. Also (see FIGS. 2, 4 and 7), the inner space within the shell or container is such as to prevent the thermometer from contacting any inner surface other than the said plate 1.

In order to secure the reservoir 8 to plate 1 in a high thermal conductivity relationship, material 9 (see FIGS. 2A and 4A) may be used to fill all of the space between the outer surface of reservoir 8 and the plate 1 surface defining groove 5. A suitable material is the type of metallic composition well known and used by dentists to fill teeth cavities. This material has high thermal transmission properties and is sufficiently plastic and pliable before becoming set to enable a form-fit between the reservoir 8 and the plate 1 surface defining groove 5. In order to insure a mechanically strong bond of thermometer 6 or 7 to plate 1 any suitable cement may be used, as at 10 in FIGS. 2A and 4A, to hold the thermometer 6 or 7 to plate 1 independently of and in addition to the bonding effect of the material 9.

The thermometers 6 and 7 may, as shown, include thereon a suitable scale whereby the temperature may be read through the plastic cover 2. It will be obvious that such a scale could be on the plate 1 or on the cover 2. It is necessary only that the scale be adjacent the capillary tube 14 for ease of reading.

It will be obvious to those skilled in the art that it may not be necessary in some embodiments for the groove 5 to comprise nothing more than a depression long enough merely to accommodate the reservoir 8. However, the preferred arrangement is a groove 5 long enough to accommodate the whole thermometer since such an arrangement facilitates the mechanical holding of the thermometer by such means, for example, as other areas of cement material 10 shown along the length of thermometers 6 and 7 in FIGS. 1, 2 and 6. And, of course, the entire surface of thermometers 6 and 7 can be cemented to grooves 5 if desired. Other suitable holding means will suggest themselves to those skilled in the art, depending upon circumstances.

Figure 6:
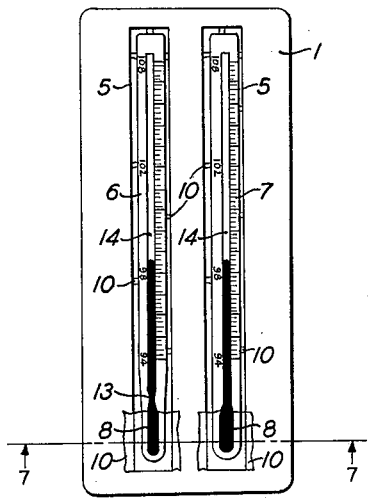
FIG. 6 shows an embodiment such as in FIG. 1, but with the plastic cover removed, and illustrating the use of two thermometers mounted in the same shell or container; and, FIG. 7 is a section taken in the direction of line 7—7 of FIG. 6 and indicating the relationship of the non-existent cover (shown by dotted lines) to the metal sheet upon which are bonded the thermometers.

In the embodiments of FIGS. 1 and 6 (see FIGS. 2 and 7 particularly), the periphery of cover 2 is provided with a shoulder 11 with which the outer periphery of plate 1 registers so that cementing material 10 (see FIG. 2) may hold plate 1 and cover 2 together and so that the shoulder 11 defines the minimum internal space within the assembly. Of course, the shoulder 11 could be on the plate 1 so that cover 2 registers therewith and, as will be apparent, such shoulder 11 need not actually be continuous. Also, it will be appreciated that the place where plate 1 and cover 2 are sealed need not actually comprise a periphery of each element. There could be some overlap in either sense depending upon particular designs. The significant construction is one which lends itself to a seal and defines in a positive manner the desired minimum internal shell or assembly spacing.

Figure 3:
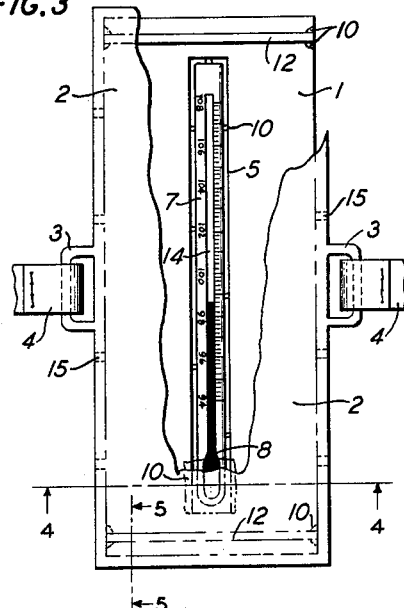
FIG. 3 shows another embodiment of the invention illustrating the use of a laboratory type thermometer mounted in a case or container of straight-line design.
Figure 5:
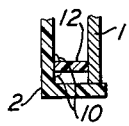
FIG. 5 is a partial section taken in the direction of line 5—5 of FIG. 3.

The problem of sealing and internal spacing may be solved in another way, as illustrated in FIGS. 3, 4, and 5. Here, spacers or partitions 12 (of platsic or any other suitable structural material) may be provided, sealed or cemented to cover 2 (at 10 of FIG. 5), and against which plate 1 abuts thereby to define the desired internal spacing and to provide a suitable place for sealing plate 1 to cover 2 (such as 10 of FIG. 4). It is obvious that the partitions could be integral parts of cover 2, such as part of a molded plastic cover 2, or could be attached to or part of plate 1. Again, the exact detail will depend upon particular design.

FIG. 6 illustrates the situation where two thermometers 6 and 7 could be mounted in a device of the character described and intended for double readings. For example, a clinical thermometer, such as 6 of FIGS. 1 and 6, is generally characterized by a necking down 13 of the capillary tube 14 so that the thermometer maintains a maximum reading until shaken-down; whereas, a laboratory type thermometer, such as 7 of FIGS. 3 and 6, is characterized by a capillary tube 14 of constant diameter whereby the reading will go up and down with temperature. Each type has its particular use and the arrangement suggested by FIG. 6 provides a means for concurrently recording a current and a "high" reading for and during any particular period of time.

In some instances it may be thought desirable to provide ventilation holes (see 15 of FIGS. 1 and 3) through the side walls of cover 2 to release from inside of the shell or container excessive heat which may become trapped therein.

The embodiments described hereinbefore are merely examples of the application of principles of the invention. Other embodiments, as well as variation of features of the invention, will become apparent to those skilled in the art without departing from the spirit and scope of the invention.

What is claimed is:

1. A portable temperature measuring device comprising an elongated hollow shell of substantially rectangular cross section and comprising one lengthwise wall of high thermal conductivity metal and a shallow cover sealed to said wall, at least two spacers in addition to said shell, said spacers rigidly connected to at least one of said cover and wall near opposite internal ends thereof and arranged within said shell abutting said cover and said wall to positively define the minimum interior spacing between the inner surfaces of said wall and said cover, said cover comprising transparent material at least throughout a portion thereof, a temperature measuring instrument comprising a temperature responsive element and means for translating responses of said element into visual indications of temperature, means for securing said instrument to the inner surface of said wall such that said element is in intimate thermal conductivity with the inner surface of said wall and such that said element is enclosed within the said minimum interior spacing of said shell so as to be out of contact with any other inner surface of said shell and such that said indicating means is visible through said transparent material from outside said shell, and means adapted to attach said shell to a body so that the outer surface of said wall abuts that part of said body whereof the temperature is to be measured.

2. The invention defined in claim 1 wherein said spacers comprise two partitions rigidly connected to the inner surface of said cover near opposite ends thereof, said partitions being oriented substantially perpendicular to the length of said cover, said partitions being of substantially the same shape corresponding to the desired minimum cross sectional space within said shell.

3. The invention defined in claim 2 wherein said wall comprises a sheet of high thermal conductivity metal having a substantially rectangular shape to define substantially an elongated rectangular shape for said shell, and wherein said cover comprises transparent material throughout having an elongated rectangular shape corresponding substantially to that of said metal sheet.

4. The invention defined in claim 3 wherein said instrument comprises a liquid thermometer having a reservoir and a capillary tube connecting therewith, said reservoir and tube containing a liquid a surface of which is arranged to move along the length of said tube according to the temperature of said liquid, and wherein said indicating means comprises a readable temperature scale adjacent the length of said tube for visually indicating the temperature of said liquid as the surface thereof moves within said tube relative to said scale.

5. The invention defined in claim 4 wherein said securing means comprises inner metal sheet surface defining a trough along the length thereof adapted to accommodate therein the said thermometer, and a high thermal conductivity bond securing at least the said thermometer reservoir in and to said trough surface.

References Cited in the file of this patent

UNITED STATES PATENTS

| | | |
|---|---|---|
| 1,247,426 | Leyer | Nov. 20, 1917 |
| 1,358,372 | Johnson | Nov. 9, 1920 |
| 2,040,292 | Brown | May 12, 1936 |
| 2,077,039 | Collens | Apr. 13, 1937 |
| 2,505,037 | Frumkin | Apr. 25, 1950 |

FOREIGN PATENTS

| | | |
|---|---|---|
| 936,537 | Germany | Dec. 15, 1955 |